(12) United States Patent
Peter

(10) Patent No.: US 8,396,761 B2
(45) Date of Patent: Mar. 12, 2013

(54) PROVIDING PRODUCT CATALOG SOFTWARE APPLICATION AS ENTERPRISE SERVICES

(75) Inventor: Markus Peter, St. Leon-Rot (DE)

(73) Assignee: SAP AG, Walldorf (DE)

( * ) Notice: Subject to any disclaimer, the term of this patent is extended or adjusted under 35 U.S.C. 154(b) by 1503 days.

(21) Appl. No.: 11/396,250

(22) Filed: Mar. 30, 2006

(65) Prior Publication Data

US 2007/0233581 A1  Oct. 4, 2007

(51) Int. Cl.
*G06Q 30/00* (2012.01)

(52) U.S. Cl. ............... 705/27.1; 705/26.1; 705/7.11; 705/28

(58) Field of Classification Search ............ 705/26, 705/27, 7, 8, 28
See application file for complete search history.

(56) References Cited

U.S. PATENT DOCUMENTS

| | | | |
|---|---|---|---|
| 4,947,321 A | 8/1990 | Spence et al. | |
| 5,550,734 A | 8/1996 | Tarter et al. | |
| 5,560,005 A | 9/1996 | Hoover et al. | |
| 5,586,312 A | 12/1996 | Johnson et al. | |
| 5,632,022 A | 5/1997 | Warran et al. | |
| 5,634,127 A | 5/1997 | Cloud et al. | |
| 5,680,619 A | 10/1997 | Gudmundson et al. | |
| 5,704,044 A | 12/1997 | Tarter et al. | |
| 5,710,917 A | 1/1998 | Musa et al. | |
| 5,768,119 A | 6/1998 | Havekost et al. | |
| 5,822,585 A | 10/1998 | Noble et al. | |
| 5,832,218 A | 11/1998 | Gibbs et al. | |
| 5,848,291 A | 12/1998 | Milne et al. | |
| 5,867,495 A | 2/1999 | Elliott et al. | |
| 5,881,230 A | 3/1999 | Christensen et al. | |
| 5,893,106 A | 4/1999 | Brobst et al. | |
| 5,918,219 A | 6/1999 | Isherwood | |
| 5,987,247 A | 11/1999 | Lau | |
| H1830 H | 1/2000 | Petrimoulx et al. | |
| 6,028,997 A | 2/2000 | Leymann et al. | |
| 6,038,393 A | 3/2000 | Iyengar et al. | |
| 6,049,838 A | 4/2000 | Miller et al. | |
| 6,070,197 A | 5/2000 | Cobb et al. | |
| 6,151,582 A | 11/2000 | Huang et al. | |
| 6,167,563 A | 12/2000 | Fontana et al. | |

(Continued)

FOREIGN PATENT DOCUMENTS

| | | |
|---|---|---|
| WO | 00/23874 | 4/2000 |
| WO | WO 2004/083984 | 9/2004 |
| WO | WO 2005/114381 | 12/2005 |

OTHER PUBLICATIONS

Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.

(Continued)

*Primary Examiner* — Jeffrey A Smith
*Assistant Examiner* — Courtney Stopp
(74) *Attorney, Agent, or Firm* — Fish & Richardson P.C.

(57) ABSTRACT

Methods and apparatus, including systems and computer program products, for a services architecture design that provides enterprise services having product catalog functionality at the level of an enterprise application. The design includes a set of service operations, process components, and optionally deployment units. Suitable business objects are also described.

12 Claims, 5 Drawing Sheets

U.S. PATENT DOCUMENTS

| | | | |
|---|---|---|---|
| 6,167,564 A | 12/2000 | Fontana et al. |
| 6,177,932 B1 | 1/2001 | Galdes et al. |
| 6,182,133 B1 | 1/2001 | Horvitz |
| 6,208,345 B1 | 3/2001 | Sheard et al. |
| 6,237,136 B1 | 5/2001 | Sadahiro |
| 6,272,672 B1 | 8/2001 | Conway |
| 6,311,170 B1 | 10/2001 | Embrey |
| 6,338,097 B1 | 1/2002 | Krenzke et al. |
| 6,424,991 B1 | 7/2002 | Gish |
| 6,434,740 B1 | 8/2002 | Monday et al. |
| 6,442,748 B1 | 8/2002 | Bowman-Amuah |
| 6,445,782 B1 | 9/2002 | Elfe et al. |
| 6,446,045 B1 | 9/2002 | Stone et al. |
| 6,446,092 B1 | 9/2002 | Sutter |
| 6,473,794 B1 | 10/2002 | Guheen et al. |
| 6,493,716 B1 | 12/2002 | Azagury et al. |
| 6,571,220 B1 | 5/2003 | Ogino et al. |
| 6,594,535 B1 | 7/2003 | Constanza |
| 6,601,233 B1 | 7/2003 | Underwood |
| 6,601,234 B1 | 7/2003 | Bowman-Amuah |
| 6,606,744 B1 | 8/2003 | Mikurak |
| 6,609,100 B2 | 8/2003 | Smith et al. |
| 6,671,673 B1 | 12/2003 | Baseman et al. |
| 6,678,882 B1 | 1/2004 | Hurley et al. |
| 6,687,734 B1 | 2/2004 | Sellink et al. |
| 6,691,151 B1 | 2/2004 | Cheyer et al. |
| 6,721,783 B1 | 4/2004 | Blossman et al. |
| 6,738,964 B1 | 5/2004 | Zink et al. |
| 6,747,679 B1 | 6/2004 | Finch et al. |
| 6,750,885 B1 | 6/2004 | Finch et al. |
| 6,764,009 B2 | 7/2004 | Melick et al. |
| 6,772,216 B1 | 8/2004 | Ankireddipally et al. |
| 6,789,252 B1 | 9/2004 | Burke et al. |
| 6,845,499 B2 | 1/2005 | Srivastava et al. |
| 6,847,854 B2 | 1/2005 | Discenzo |
| 6,859,931 B1 | 2/2005 | Cheyer et al. |
| 6,889,197 B2 | 5/2005 | Lidow |
| 6,889,375 B1 | 5/2005 | Chan et al. |
| 6,895,438 B1 | 5/2005 | Ulrich |
| 6,898,783 B1 | 5/2005 | Gupta et al. |
| 6,904,399 B2 | 6/2005 | Cooper et al. |
| 6,907,395 B1 | 6/2005 | Hunt et al. |
| 6,954,736 B2 | 10/2005 | Menninger et al. |
| 6,985,939 B2 | 1/2006 | Fletcher et al. |
| 6,990,466 B1 | 1/2006 | Hu |
| 7,003,474 B2 | 2/2006 | Lidow |
| 7,031,998 B2 | 4/2006 | Archbold |
| 7,043,448 B2 | 5/2006 | Campbell |
| 7,047,518 B2 | 5/2006 | Little et al. |
| 7,050,056 B2 | 5/2006 | Meyringer |
| 7,050,873 B1 | 5/2006 | Discenzo |
| 7,055,136 B2 | 5/2006 | Dzoba et al. |
| 7,058,587 B1 | 6/2006 | Horne |
| 7,069,536 B2 | 6/2006 | Yaung |
| 7,072,855 B1 | 7/2006 | Godlewski et al. |
| 7,076,766 B2 | 7/2006 | Wirts et al. |
| 7,117,447 B2 | 10/2006 | Cobb et al. |
| 7,120,597 B1 | 10/2006 | Knudtzon et al. |
| 7,120,896 B2 | 10/2006 | Budhiraja et al. |
| 7,131,069 B1 | 10/2006 | Rush et al. |
| 7,155,403 B2 | 12/2006 | Cirulli et al. |
| 7,155,409 B1 | 12/2006 | Stroh |
| 7,181,694 B2 | 2/2007 | Reiss et al. |
| 7,184,964 B2 | 2/2007 | Wang |
| 7,194,431 B1 | 3/2007 | Land et al. |
| 7,197,740 B2 | 3/2007 | Beringer et al. |
| 7,200,569 B2 | 4/2007 | Gallagher et al. |
| 7,206,768 B1 | 4/2007 | deGroeve et al. |
| 7,216,091 B1 | 5/2007 | Blandina et al. |
| 7,219,107 B2 | 5/2007 | Beringer |
| 7,222,786 B2 | 5/2007 | Renz et al. |
| 7,225,240 B1 | 5/2007 | Fox et al. |
| 7,249,044 B2 | 7/2007 | Kumar et al. |
| 7,257,254 B2 | 8/2007 | Tunney |
| 7,283,973 B1 | 10/2007 | Loghmani et al. |
| 7,293,254 B2 | 11/2007 | Bloesch et al. |
| 7,299,970 B1 | 11/2007 | Ching |
| 7,315,830 B1 | 1/2008 | Wirtz et al. |
| 7,322,024 B2 | 1/2008 | Carlson et al. |
| 7,324,966 B2 | 1/2008 | Scheer |
| 7,353,180 B1 | 4/2008 | Silverstone et al. |
| 7,356,492 B2 * | 4/2008 | Hazi et al. .................. 705/26.5 |
| 7,367,011 B2 | 4/2008 | Ramsey et al. |
| 7,370,315 B1 | 5/2008 | Lovell et al. |
| 7,376,601 B1 | 5/2008 | Aldridge |
| 7,376,604 B1 | 5/2008 | Butcher |
| 7,376,632 B1 | 5/2008 | Sadek et al. |
| 7,383,201 B2 | 6/2008 | Matsuzaki et al. |
| 7,386,833 B2 | 6/2008 | Granny et al. |
| 7,406,716 B2 | 7/2008 | Kanamori et al. |
| 7,415,697 B1 | 8/2008 | Houlding |
| 7,418,409 B1 | 8/2008 | Goel |
| 7,418,424 B2 | 8/2008 | Martin et al. |
| 7,448,022 B1 | 11/2008 | Ram et al. |
| 7,451,432 B2 | 11/2008 | Shukla et al. |
| 7,460,654 B1 | 12/2008 | Jenkins et al. |
| 7,461,030 B2 | 12/2008 | Hibler et al. |
| 7,469,233 B2 | 12/2008 | Shooks et al. |
| 7,516,088 B2 | 4/2009 | Johnson et al. |
| 7,523,054 B2 | 4/2009 | Tyson-Quah |
| 7,529,699 B2 | 5/2009 | Fuse et al. |
| 7,536,325 B2 | 5/2009 | Randell et al. |
| 7,536,354 B1 | 5/2009 | deGroeve et al. |
| 7,546,520 B2 | 6/2009 | Davidson et al. |
| 7,546,575 B1 | 6/2009 | Dillman et al. |
| 7,565,640 B2 | 7/2009 | Shukla et al. |
| 7,624,371 B2 | 11/2009 | Kulkarni et al. |
| 7,631,291 B2 | 12/2009 | Shukla et al. |
| 7,640,195 B2 | 12/2009 | Von Zimmermann et al. |
| 7,640,291 B2 | 12/2009 | Maturana et al. |
| 7,644,390 B2 | 1/2010 | Khodabandehloo et al. |
| 7,657,406 B2 | 2/2010 | Tolone et al. |
| 7,657,445 B1 | 2/2010 | Goux |
| 7,665,083 B2 | 2/2010 | Demant et al. |
| 7,668,761 B2 | 2/2010 | Jenkins et al. |
| 7,672,888 B2 | 3/2010 | Allin et al. |
| 7,681,176 B2 | 3/2010 | Willis et al. |
| 7,693,586 B2 | 4/2010 | Dumas et al. |
| 7,703,073 B2 | 4/2010 | Illowsky et al. |
| 7,739,160 B1 | 6/2010 | Ryan et al. |
| 7,742,985 B1 | 6/2010 | Digrigoli et al. |
| 7,747,980 B2 | 6/2010 | Illowsky et al. |
| 7,765,156 B2 | 7/2010 | Staniar et al. |
| 7,765,521 B2 | 7/2010 | Bryant |
| 7,788,145 B2 | 8/2010 | Wadawadigi et al. |
| 7,788,319 B2 | 8/2010 | Schmidt et al. |
| 7,793,256 B2 | 9/2010 | Charisius et al. |
| 7,793,258 B2 | 9/2010 | Sundararajan et al. |
| 7,797,698 B2 | 9/2010 | Diament et al. |
| 7,814,142 B2 | 10/2010 | Mamou et al. |
| 7,822,682 B2 | 10/2010 | Arnold et al. |
| 7,835,971 B2 | 11/2010 | Stockton et al. |
| 7,886,041 B2 | 2/2011 | Outhred et al. |
| 7,895,568 B1 | 2/2011 | Goodwin et al. |
| 7,904,350 B2 | 3/2011 | Ayala et al. |
| 7,912,755 B2 | 3/2011 | Perry et al. |
| 7,917,889 B2 | 3/2011 | Devarakonda et al. |
| 7,925,985 B2 | 4/2011 | Moore |
| 8,001,519 B2 | 8/2011 | Conallen et al. |
| 2001/0052108 A1 | 12/2001 | Bowman-Amuah |
| 2002/0026394 A1 | 2/2002 | Savage et al. |
| 2002/0042756 A1 | 4/2002 | Kumar et al. |
| 2002/0049622 A1 | 4/2002 | Lettich et al. |
| 2002/0073114 A1 | 6/2002 | Nicastro et al. |
| 2002/0078046 A1 | 6/2002 | Uluakar et al. |
| 2002/0082892 A1 | 6/2002 | Raffel et al. |
| 2002/0103660 A1 | 8/2002 | Cramon et al. |
| 2002/0104071 A1 | 8/2002 | Charisius et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |
| 2002/0184111 A1 | 12/2002 | Swanson |

| | | |
|---|---|---|
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0069774 A1 | 4/2003 | Hoffman et al. |
| 2003/0074271 A1* | 4/2003 | Viswanath et al. ............. 705/26 |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0093268 A1 | 5/2004 | Ramchandani et al. |
| 2004/0111304 A1 | 6/2004 | Meka et al. |
| 2004/0111639 A1 | 6/2004 | Schwartz et al. |
| 2004/0128180 A1 | 7/2004 | Abel et al. |
| 2004/0133481 A1 | 7/2004 | Schwarze et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1 | 9/2004 | Grounds |
| 2004/0181538 A1 | 9/2004 | Lo et al. |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward, Jr. |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1* | 6/2005 | Hazi et al. ..................... 705/27 |
| 2005/0144125 A1 | 6/2005 | Erbey et al. |
| 2005/0144226 A1 | 6/2005 | Purewal |
| 2005/0156500 A1 | 7/2005 | Birecki et al. |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0222896 A1 | 10/2005 | Rhyne et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0257197 A1 | 11/2005 | Herter et al. |
| 2005/0262192 A1 | 11/2005 | Mamou et al. |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1* | 4/2006 | Seubert et al. ................. 707/100 |
| 2006/0085243 A1 | 4/2006 | Cooper et al. |
| 2006/0085294 A1 | 4/2006 | Boerner et al. |
| 2006/0085336 A1* | 4/2006 | Seubert et al. ................ 705/40 |
| 2006/0089886 A1* | 4/2006 | Wong ........................... 705/26 |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0143164 A1 | 6/2007 | Kaila et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156430 A1 | 7/2007 | Kaetker et al. |
| 2007/0156474 A1 | 7/2007 | Scherberger et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156499 A1 | 7/2007 | Berger et al. |
| 2007/0156500 A1 | 7/2007 | Merkel et al. |
| 2007/0156538 A1* | 7/2007 | Peter et al. ..................... 705/26 |
| 2007/0156550 A1 | 7/2007 | Der Emde et al. |
| 2007/0156731 A1 | 7/2007 | Ben-Zeev |
| 2007/0162893 A1 | 7/2007 | Kaetker et al. |
| 2007/0168303 A1 | 7/2007 | Kaetker et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |
| 2007/0198391 A1 | 8/2007 | Dreyer et al. |
| 2007/0214065 A1 | 9/2007 | Kahlon et al. |
| 2007/0220046 A1 | 9/2007 | Kaetker et al. |
| 2007/0220143 A1 | 9/2007 | Lund et al. |
| 2007/0233539 A1 | 10/2007 | Suenderhauf et al. |
| 2007/0233541 A1 | 10/2007 | Schorr et al. |
| 2007/0233574 A1 | 10/2007 | Koegler et al. |
| 2007/0233575 A1 | 10/2007 | Berger et al. |
| 2007/0233598 A1 | 10/2007 | Der Emde et al. |
| 2007/0234282 A1 | 10/2007 | Prigge et al. |
| 2007/0239508 A1 | 10/2007 | Fazal et al. |
| 2007/0239569 A1 | 10/2007 | Lucas et al. |
| 2007/0265862 A1 | 11/2007 | Freund et al. |
| 2008/0004929 A9 | 1/2008 | Raffel et al. |
| 2008/0017722 A1 | 1/2008 | Snyder et al. |
| 2008/0027831 A1 | 1/2008 | Gerhardt |
| 2008/0065437 A1 | 3/2008 | Dybvig |
| 2008/0120129 A1 | 5/2008 | Seubert et al. |
| 2008/0147507 A1 | 6/2008 | Langhammer |
| 2008/0162382 A1 | 7/2008 | Clayton et al. |
| 2008/0208707 A1 | 8/2008 | Erbey et al. |
| 2008/0215354 A1 | 9/2008 | Halverson et al. |
| 2009/0037287 A1 | 2/2009 | Baitalmal et al. |
| 2009/0037492 A1 | 2/2009 | Baitalmal et al. |
| 2009/0063112 A1 | 3/2009 | Hader et al. |
| 2009/0171716 A1 | 7/2009 | Suenderhauf et al. |
| 2009/0171818 A1 | 7/2009 | Penning et al. |
| 2009/0172699 A1 | 7/2009 | Jungkind et al. |
| 2009/0189743 A1 | 7/2009 | Abraham et al. |
| 2009/0192858 A1 | 7/2009 | Johnson |
| 2010/0070324 A1 | 3/2010 | Bock et al. |
| 2010/0070331 A1 | 3/2010 | Koegler et al. |
| 2010/0070336 A1 | 3/2010 | Koegler et al. |
| 2010/0070395 A1 | 3/2010 | Elkeles et al. |
| 2010/0070555 A1 | 3/2010 | Duparc et al. |
| 2010/0100464 A1 | 4/2010 | Ellis et al. |
| 2010/0138269 A1 | 6/2010 | Cirpus et al. |
| 2011/0252395 A1 | 10/2011 | Charisius et al. |

OTHER PUBLICATIONS

Anon,; "Sequenst Corp Bell Atlantic: Bell Atlantic Selects Sequent for Video-on-Demand Program; Sequent Moves to Sieze Opportunity in New Market"; Business Wire; Dec. 6, 1994.

Anon.; "State of the Art Reports™ 13,000 MAS 90® for Windows® Shipments in First Nine Months of Availability"; PR Newswire; Apr. 28, 1997.
Arch-int, S. et al.; "Development of Industrial Information Systems on the Web Using Busienss Components"; Computers in Industry; vol. 60; 2003; pp. 231-250.
Astudillo, H.; "How Conceptual System Architecture Leads to Business Process"; ACM; 2000; pp. 35-36.
Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.
Avery, S.; "Buyer's Guide to Software for Purchasing 2000.(Directory)"; Purchasing, vol. 129, No. 1; p. 179; Jul. 13, 2000.
Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.
Cowan, D.D. et al.; "Application Integration: Constructing Composite Applications from Interactive Components"; Software Practice and Experience; vol. 23, No. 3; Mar. 1993; pp. 255-275.
Deimel, A.; "The SAP R/3 Business Framework"; Software—Concepts & Tools; vol. 19, No. 1; 1998; pp. 29-36.
Fellner, K.J., et al.; "Classification Framework for Business Components"; System Sciences; Proceedings of the 33rd Annual Hawaii International Conference; Jan. 2000; pp. 3239-3248.
Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.
Gauthier, P. and OSS-J Architecture Board; "OSS through Java (TM) J2EE Design Guidelines"; [online]; Oct. 31, 2001; http://www.ossj.org/downloads/design_guidelines.shtml.
Gessford, J.E.; "Object-Oriented System Design"; Emerging Information Technologies for Competitive Advantage and Economic Development; Proceedings of the 1992 Information Resources Management Association International Conference; 1992; pp. 110-118.
He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.
"Hudson's Bay Company Realizes Fast ROI with the Oracle E-Business Suite"; PR Newswire; New York; Jan. 15, 2002; p. 1.
Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.
Kythe, D.K.; "The Promise of Distributed Business Components"; Bell Labs Technical Journal; vol. 75, No. 2; Mar./Apr. 1999; pp. 20-28.
Linthicum, D.S.; "Chapter 9: RPCs, Messaging, and B2B Application Integration"; B2B Application Integration: E-Business Enable Your Enterprise; 2001; pp. 167-181.
Nori A.K. et al.; "Composite Applications: Process Based Application Development"; Lecture Notes in Computer Science; vol. 2444; Aug. 2003; pp. 48-53.
Pilhofer, F.; "Writing and Using CORBA Components"; Apr. 2002; http://www.fpx.de/MicoCCM/download/mico-ccm.pdf; 17 pages.
Ravichandran, T.; "Special Issue on Component-Based Software Development"; The Data Base for Advances in Information Systems; 2003; pp. 45-46.
SAP AG; "Designing Cross Solutions"; SAP XAPPS, [online]; Sep. 2003; pp. 1-2; http://www.sap.com/belux/platform/netweaver/pdf/BWP_CAF.pdf.
Schmid, H.A.; "Business Entity Components and Buisness Process Components"; Joop; vol. 12, No. 6; Oct. 1999; pp. 6-10, 12-15.
Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.

Singh, I. et al.; "Designing Enterprise Applications with the J2EE Platform, Second Edition"; Jun. 15, 2002.
Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.
Thomas, A.; "Enterprise JavaBeans Server Component Model for Java"; [online]; Dec. 1997; http://www.cs.indiana.edu/classes/b649-gann/ejb-white-paper.pdf.
Vergil Technology Ltd.; "Vergil Composite Application Builder Suite"; Product Datasheet [online]; 2003; pp. 1-5; http://www.webservicesmall.com.docs/VCAB_datasheet.pdf.
Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.
International Search Report and Written Opinion of the International Searching Authority issued in International Application No. PCT/EP2006/012625; Apr. 3, 2007; 8 pages.
International Preliminary Report on Patentability issued in International Application No. PCT/EP2006/012625; Jul. 1, 2008; 7 pages.
International Search Report and Written Opinion of the International Searching Authority issued in International Application No. PCT/EP2006/012614; Mar. 16, 2007; 7 pages.
International Preliminary Report on Patentability issued in International Application No. PCT/US2006/012614; Jul. 1, 2008; 6 pages.
International Search Report and Written Opinion of the International Searching Authority issued in International Application No. PCT/EP2006/012618; Apr. 3, 2007; 8 pages.
International Preliminary Report on Patentability issued in International Application No. PCT/EP2006/012618; Jul. 1, 2008; 7 pages.
International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.
International Search Report and Written Opinion of the International Searching Authority issued in International Application No. PCT/EP2006/012624; Mar. 30, 2007; 9 pages.
International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
International Preliminary Report on Patentability issued in International Application No. PCT/EP2007/002835; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.

Extended European Search Report issued in European Application No. 07007130.3; Oct. 5, 2007; 6 pages.
Office Action issued in U.S. Appl. No. 11/323,041; Apr. 30, 2009; 26 pages.
Office Action issued in U.S. Appl. No. 11/322,612; May 11, 2009; 24 pages.
Office Action issued in U.S. Appl. No. 11/322,772; Mar. 25, 2009; 12 pages.
Office Action issued in U.S. Appl. No. 11/323,590; Jan. 9, 2009; 23 pages.
Office Action issued in U.S. Appl. No. 11/396,288; Jan. 2, 2009; 18 pages.
Office Action issued in U.S. Appl. No. 11/396,288; Apr. 15, 2008; 26 pages.
Office Action issued in U.S. Appl. No. 11/397,029; Jul. 21, 2009; 28 pages.
Office Action issued in U.S. Appl. No. 11/323,040; Jul. 24, 2009; 35 pages.
Office Action issued in U.S. Appl. No. 11/323,590; Jul. 10, 2009; 32 pages.
Office Action issued in U.S. Appl. No. 11/322,816; Jul. 23, 2006; 41 pages.
Office Action issued in U.S. Appl. No. 11/322,851; Sep. 2, 2009; 32 pages.
Office Action issued in U.S. Appl. No. 11/323,590; Dec. 30, 2009; 31 pages.
Office Action issued in U.S. Appl. No. 11/322,482; Jan. 7, 2010; 19 pages.
Office Action issued in U.S. Appl. No. 11/322,772; Dec. 9, 2009; 14 pages.
Office Action issued in U.S. Appl. No. 11/323,039; Sep. 4, 2009; 36 pages.
Office Action issued in U.S. Appl. No. 11/323,634; Sep. 10, 2009; 15 pages.
Office Action issued in U.S. Appl. No. 11/322,383; Nov. 12, 2009; 29 pages.
Office Action issued in U.S. Appl. No. 11/396,258; Nov. 25, 2009; 9 pages.
Office Action issued in U.S. Appl. No. 12/333,085; Jun. 25, 2009; 9 pages.
Office Action issued in U.S. Appl. No. 11/396,288; Aug. 19, 2009; 20 pages.
"American Software Announces ASP Pricing Model for It's a-Applications Expense Business Solution"; PR Newswire; Mar. 6, 2000; 2 pages.
Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable Systems: Problem Model Construction"; ACM SIGSOFT; vol. 33, No. 3; 2008; pp. 1-13.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Duc et al.; "Uniform Object Modeling Methodology and Reuse of Real Time System Using UML"; EMSOFT '05; Sep. 19-22, 2005; pp. 44-47.
Gomaa et al.; "Model Based Software Design and Adaption"; International Workshop on Software Engineering for Adaptive and Self-Managing Systems (SEAMS '07); IEEE; 2007; 10 pages.
Huang, S. et al.; "Computer-Assisted Supply Chain Configuration Based on Supply Chain Operations Reference (SCOR) Model"; Computers & Industrial Engineering 48; 2005; pp. 377-394.
Intuit Canada Ltd.; "Startup Guide—QuickBooks Basic for Windows, QuickBooks Pro for Windows, QuickBooks Premier for Windows"; 2002; 230 pages.
Lambert et al.; "Supply Chain Metrics"; International Journal of Logistics Management; vol. 12, No. 1; 2001; pp. 1-19.

Lockamy III, et al.; "Linking SCOR Planning Practices to Supply Chain Performance"; International Journal of Operationgs & Production Management; vol. 24, No. 12; pp. 1192-1218.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
"Oracle Expands E-Commerce Offerings with the Acquisition of E-Travel, Inc."; PR Newswire; Mar. 9, 1999; 3 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy: The Executive's Journal; Summer 2003; pp. 12-20.
Stephens, S.; "Supply Chain Council & Supply Chain Operations Reference (SCOR) Model Overview"; <http://www.supply-chain.org>; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Notice of Allowance issued in U.S. Appl. No. 11/322,610 on Jun. 14, 2010; 6 pages.
Office Action issued in U.S. Appl. No. 11/322,772; Jul. 12, 2010; 18 pages.
Office Action issued in U.S. Appl. No. 11/322,398 on Apr. 2, 2010; 39 pages.
Notice of Allowance issued in U.S. Appl. No. 11/322,398 on Jul. 23, 2010; 38 pages.
Office Action issued in U.S. Appl. No. 11/322,383; May 12, 2010; 23 pages.
Office Action issued in U.S. Appl. No. 11/322,382 on Mar. 29, 2010; 28 pages.
Office Action issued in U.S. Appl. No. 11/323,041 on Mar. 19, 2010; 26 pages.
Advisory Action issued in U.S. Appl. No. 11/323,041 on Jun. 7, 2010; 3 pages.
Notice of Allowance issued in U.S. Appl. No. 11/396,259 on Mar. 29, 2010; 19 pages.
Notice of Allowance issued in U.S. Appl. No. 11/396,259 on Jul. 6, 2010; 6 pages.
Notice of Allowance issued in U.S. Appl. No. 11/396,288; May 20, 2010; 15 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Office Action issued in U.S. Appl. No. 11/396,236 on Mar. 31, 2010; 20 pages.

Office Action issued in U.S. Appl. No. 11/323,039; Apr. 14, 2010; 15 pages.
Office Action issued in U.S. Appl. No. 11/322,851; May 12, 2010; 15 pages.
Office Action issued in U.S. Appl. No. 11/322,845; Jul. 15, 2010; 16 pages.
Office Action issued in U.S. Appl. No. 11/323,040; Apr. 29, 2010; 17 pages.
Office Action issued in U.S. Appl. No. 11/322,612; Apr. 1, 2010; 23 pages.
Advisory Action issued in U.S. Appl. No. 11/322,612; Jun. 24, 2010; 3 pages.
Notice of Allowance issued in U.S. Appl. No. 11/397,026 on Mar. 29, 2010; 17 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 12/233,554 on May 14, 2010; 11 pages.
Notice of Allowance issued in U.S. Appl. No. 12/233,534 on Jun. 24, 2010; 15 pages.
Notice of Allowance issued in U.S. Appl. No. 12/327,354 on Jun. 25, 2010; 16 pages.
Notice of Allowance issued in U.S. Appl. No. 11/967,865 on Mar. 31, 2010; 16 pages.
Notice of Allowance issued in U.S. Appl. No. 11/322,482; Jul. 13, 2010; 5 pages.
Office Action issued in U.S. Appl. No. 11/323,590; Jun. 21, 2010; 25 pages.
Office Action issued in U.S. Appl. No. 11/323,634; Apr. 2, 2010; 9 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 12/333,085; Mar. 23, 2010; 5 pages.
Cascallar, Eduardo et al.; "Assessment in the Evaluation of Self-Regulation as a Process"; Educational Psychology Review; vol. 18, No. 3; Sep. 2006; pp. 297-306.
Cool, David W.; "Activity Fund Accounting"; School Business Affairs; vol. 49, No. 6; Jun. 1983; pp. 50-52.
Ferscha et al.; "A Light-Weight Component Model for Peer-to-Peer Applications"; IEEE; Mar. 23, 2004.
Flissi et al.; "A Component-based Software Infrastructure for Ubiquitous Computing"; IEEE; Jul. 4, 2005.
SAP AG; "SAP NetWeaver Visual Composer: User Guide (SAP NetWeaver Visual Composer release 6.0)"; Document version 1.1; pp. 1-208.
SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMWFAQ_50070686_en.pdf.
Strelich, Thomas P. et al.; "Simulation-Based Transformation with the Service Integration/Interoperation Infrastructure"; Technology Review Journal; Fall/Winter 2005; pp. 99-115.
Office Action issued in U.S. Appl. No. 11/396,312 on Sep. 10, 2010; 23 pages.
Office Action issued in U.S. Appl. No. 11/322,611 on Sep. 16, 2010; 21 pages.
Notice of Allowance issued in U.S. Appl. No. 11/322,610 on Sep. 23, 2010; 6 pages.
Notice of Allowance issued in U.S. Appl. No. 11/322,610 on Dec. 22, 2010; 6 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowance issued in U.S. Appl. No. 11/322,382 on Sep. 20, 2010; 6 pages.
Notice of Allowance issued in U.S. Appl. No. 11/322,382 on Jan. 6, 2011; 7 pages.

Notice of Allowance issued in U.S. Appl. No. 11/396,259 on Oct. 15, 2010; 6 pages.
Notice of Allowance issued in U.S. Appl. No. 11/396,288; Sep. 24, 2010; 4 pages.
Notice of Allowance issued in U.S. Appl. No. 11/396,288; Dec. 28, 2010; 4 pages.
Notice of Allowance issued in U.S. Appl. No. 11/396,258 on Jul. 28, 2010; 9 pages.
Notice of Allowance issued in U.S. Appl. No. 11/396,258 on Nov. 16, 2010; 8 pages.
Office Action issued in U.S. Appl. No. 11/396,236 on Oct. 28, 2010; 19 pages.
Notice of Allowance issued in U.S. Appl. No. 11/322,845; Dec. 27, 2010; 16 pages.
Office Action issued in U.S. Appl. No. 11/323,040 on Nov. 5, 2010; 33 pages.
Notice of Allowance issued in U.S. Appl. No. 11/397,026 on Nov. 15, 2010; 7 pages.
Notice of Allowance issued in U.S. Appl. No. 12/233,554 on Sep. 17, 2010; 10 pages.
Notice of Allowance issued in U.S. Appl. No. 11/968,054 on Sep. 7, 2010; 11 pages.
Office Action issued in U.S. Appl. No. 12/233,557 on Sep. 16, 2010; 16 pages.
Notice of Allowance issued in U.S. Appl. No. 12/233,534 on Oct. 20, 2010; 15 pages.
Notice of Allowance issued in U.S. Appl. No. 12/327,354 on Oct. 18, 2010; 16 pages.
Notice of Allowance issued in U.S. Appl. No. 11/967,865 on Oct. 6, 2010; 6 pages.
Office Action issued in U.S. Appl. No. 11/322,973 on Dec. 7, 2010; 13 pages.
Office Action issued in U.S. Appl. No. 11/967,483; Aug. 20, 2010; 10 pages.
Notice of Allowance issued in U.S. Appl. No. 11/396,327 on Nov. 30, 2010; 28 pages.
Office Action issued in U.S. Appl. No. 11/404,147 on Nov. 24, 2010; 27 pages.
Notice of Allowance issued in U.S. Appl. No. 12/333,085; Sep. 13, 2010; 8 pages.
Bin et al.; "Component Model Optimization for Distributed Real-Time Embedded Software"; IEEE International Conference on Systems, Man and Cybernetics; Oct. 13, 2004; 6 pages.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cox et al.; "A Formal Model for Component Based Software"; IEEE; Aug. 7, 2002; 8 pages.
Gould; "Integrating the Manufacturing Enterprise"; Automative Design & Production; 119, 1; ABI/INFORM Global; Jan. 2007; 3 pages.
Huang et al.; "Supply Chain Configuration Based on Supply Chain Operations Reference (SCOR) Model"; Computers and Industrial Engineering; Elsevier; 2005.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0-8306-7626-0.
Papazoglou et al; "Service-Oriented Computing Research Road Map"; http://infolab.uvt.nl/pub/papazogloump-2006-96.pdf; Mar. 1, 2006; 29 pages.
Notice of Allowance issued in U.S. Appl. No. 12/233,554 on Feb. 22, 2011; 7 pages.
Office Action issued in U.S. Appl. No. 12/233,550 on Jan. 12, 2011; 29 pages.
Notice of Allowance issued in U.S. Appl. No.. 12/233,550 on May 11, 2011; 20 pages.
Office Action issued in U.S. Appl. No. 11/323,634 on Apr. 29, 2011; 8 pages.

Notice of Allowance issued in U.S. Appl. No. 12/233,462 on Feb. 2, 2011; 11 pages.
Office Action issued in U.S. Appl. No. 11/967, 483 on Mar. 4, 2011; 6 pages.
Notice of Allowance issued in U.S. Appl. No. 12/233,534 on Jan. 31, 2011; 15 pages.
Notice of Allowance issued in U.S. Appl. No. 11/322,610 on Mar. 31, 2011; 6 pages.
Notice of Allowance issued in U.S. Appl. No. 11/396,259 on Jan. 20, 2011; 6 pages.
Notice of Allowance issued in U.S. Appl. No. 11/322,845; Apr. 8, 2011; 8 pages.
Notice of Allowance issued in U.S. Appl. No. 11/397,026 on Mar. 3, 2011; 6 pages.
Office Action issued in U.S. Appl. No. 12/233,417 on Apr. 7, 2011; 32 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,557 on Mar. 4, 2011; 19 pages.
Office Action issued in U.S. Appl. No. 11/967,393 o n. Apr. 15, 2011; 12 pages.
Notice of Allowance issued in U.S. Appl. No. 12/327,354 on Feb. 1, 2011; 16 pages.
Finin et al.; "KQML as an Agent Communication Language"; retrieved on Jul. 26, 2011; pp. 456-463. <http://portal.acm.org/citation.cfm?id=191322>.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.
Notice of Allowance issued in U.S. Appl. No. 12/233,554 on Jun. 27, 2011; 7 pages.
Office Action issued in U.S. Appl. No. 12/333,146 on Sep. 6, 2011; 21 pages.
Office Action issued in U.S. Appl. No. 11/322,973 on May 27, 2011; 15 pages.
Office Action issued in U.S. Appl. No. 11/404,147 on Aug. 4, 2011; 26 pages.
Notice of Allowance issued in U.S. Appl. No. 12/233,462 on May 18, 2011; 6 pages.
Office Action issued in U.S. Appl. No. 12/233,457 on May 26, 2011; 19 pages.
Office Action issued in U.S. Appl. No. 12/327,232 on May 26, 2011; 20 pages.
Office Action issued in U.S. Appl. No. 12/327,590 on Jun. 23, 2011; 16 pages.
Office Action issued in U.S. Appl. No. 12/233,087 on Aug. 18, 2011; 42 pages.
Notice of Allowance issued in U.S. Appl. No. 12/233,534 on May 16, 2011; 12 pages.
Notice of Allowance issued in U.S. Appl. No. 11/322,382 on Jul. 25, 2011; 5 pages.
Notice of Allowanced issued in U.S. Appl. No. 11/322,398 on May 27, 2011; 21 pages.
Notice of Allowance issued in U.S. Appl. No. 11/396,258 on Jun. 28, 2011; 9 pages.
Office Action issued in U.S. Appl. No. 11/323,040 on Jul. 26, 2011; 34 pages.
Notice of Allowance issued in U.S. Appl. No. 11/397,026 on Jul. 20, 2011; 8 pages.
Office Action issued in U.S. Appl. No. 12/233,489 on May 13, 2011; 15 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.
Anonymous; "Mastering Management"; Motor Age, vol. 25, No. 10; Oct. 2006; pp. 1-3.
Gerin et al.; "Flexible and Executable Hardware/Software Interface Modeling for Multiprocessor SOC Design Using SystemC"; IEEE; 2007; pp. 390-395.
Hahn; "A Domain Specific Modeling Language for Multi-Agent Systems"; ACM AAMAS; 2008; pp. 233-240.
Hu; "A Co-Design Modeling Approach for Computer Network Systems"; IEEE; 2007; pp. 685-693.
Kremic, Tibor; "Outsourcing Decision Support: A Survey of Benefits, Risks, and Decision Factor"; Supply Chain Management; V. 11; 2006; pp. 467-482.
Sarjoughian et al.; "CoSMOs: A Visual Environment for Component Based Modeling, Experimental Design and Simulation"; ACM; 2009; pp. 1-9.
Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.
Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.
Notice of Allowance issued in U.S. Appl. No. 12/233,550 on Jan. 9, 2012; 11 pages.
Office Action issued in U.S. Appl. No. 12/333,146 on Feb. 2, 2012; 21 pages.
Notice of Allowance issued in U.S. Appl. No. 11/323,634 on Jan. 25, 2012; 5 pages.
Notice of Allowance issued in U.S. Appl. No. 11/396,327 on Sep. 28, 2011; 31 pages.
Office Action issued in U.S. Appl. No. 12/233,479 on Oct. 27, 2011; 24 pages.
Office Action issued in U.S. Appl. No. 12/332,965 on Oct. 11, 2011; 6 pages.
Notice of Allowance issued in U.S. Appl. No. 12/233,462 on Sep. 2, 2011; 7 pages.
Notice of Allowance in U.S. Appl. No. 12/233,462 on Dec. 12, 2011; 6 pages.
Office Action issued in U.S. Appl. No. 12/233,289 on Oct. 27, 2011; 15 pages.
Notice of Allowance issued in U.S. Appl. No. 12/233,457 on Nov. 3, 2011; 12 pages.
Notice of Allowance issued in U.S. Appl. No. 12/327,232 on Nov. 2, 2011; 16 pages.
Notice of Allowance issued in U.S. Appl. No. 12/327,590 on Dec. 28, 2011; 10 pages.
Office Action issued in U.S. Appl. No. 12/327,701 on Nov. 8, 2011; 20 pages.
Notice of Allowance issued in U.S. Appl. No. 12/233,534 won Dec. 28, 2011; 7 pages.
Notice of Allowanced issued in U.S. Appl. No. 11/322,398 on Oct. 18, 2011; 7 pages.
Office Action issued in U.S. Appl. No. 11/322,383 on May 12, 2010; 23 pages.
Office Action issued in U.S. Appl. No. 11/322,383 on Nov. 12, 2009; 23 pages.
Examiner's Answer to Appeal Brief issued in U.S. Appl. No. 11/396,236 on Nov. 10, 2011; 19 pages.
Notice of Allowance issued in U.S. Appl. No. 11/396,259 on Aug. 5, 2011; 7 pages.
Office Action issued in U.S. Appl. No. 11/396,288 on Oct. 17, 2011; 38 pages.
Notice of Allowance issued in U.S. Appl. No. 11/396,258 on Feb. 3, 2012; 12 pages.
Office Action issued in U.S. Appl. No. 11/396,252 on Nov. 10, 2011; 18 pages.
Notice of Allowance issued in U.S. Appl. No. 11/322,851 on Sep. 2, 2011; 8 pages.

Notice of Allowance issued in U.S. Appl. No. 11/322,845; Nov. 13, 2011; 9 pages.
Office Action issued in U.S. Appl. No. 11/397,026; Jul. 21, 2009; 28 pages.
Notice of Allowance issued in U.S. Appl. No. 11/397,026 on Nov. 4, 2011; 8 pages.
Notice of Allowance issued in U.S. Appl. No. 12/233,520 on Nov. 10, 2011; 22 pages.
Notice of Allowance issued in U.S. Appl. No. 12/233,417 on Sep. 14, 2011; 11 pages.
Notice of Allowance issued in U.S. Appl. No. 11/968,054 on Aug. 2, 2011; 5 pages.
Office Action issued in U.S. Appl. No. 12/233,458 on Oct. 12, 2011; 19 pages.
Office Action issued in U.S. Appl. No. 11/967,489 on Sep. 28, 2011; 7 pages.
Office Action issued in U.S. Appl. No. 11/967,489 on Feb. 6, 2012; 9 pages.
Notice of Allowance issued in U.S. Appl. No. 11/967,393 on Nov. 9, 2011; 9 pages.
Notice of Allowance issued in U.S. Appl. No. 12/327,354 on Aug. 9, 2011; 13 pages.

* cited by examiner

PROVIDING PRODUCT CATALOG SOFTWARE APPLICATION AS ENTERPRISE SERVICES

BACKGROUND

This specification relates to data processing systems implemented on computers, and more particular to data processing systems providing services in the nature of web services.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

Web services are one technology for making the functionality of software applications available to other software, including other applications. A web service is a standards-based way of encapsulating the functionality of an application that other applications can locate and access. A service-oriented architecture is a distributed software model within which functionality is defined as independent web services. Within a service-oriented architecture, web services can be used in defined sequences according to business logic to form applications that enable business processes.

SUMMARY

This specification describes a services architecture design that provides enterprise services having product catalog functionality at the level of an enterprise application. Enterprise services are web services that have an enterprise-level business value.

In its various aspects, the invention can be embodied in systems, methods, and computer program products. For example, a system in one embodiment implements a services architecture design that provides enterprise services having product catalog functionality at the level of an enterprise application. The design includes a set of service operations, process components, and optionally deployment units. Suitable business objects are also described.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
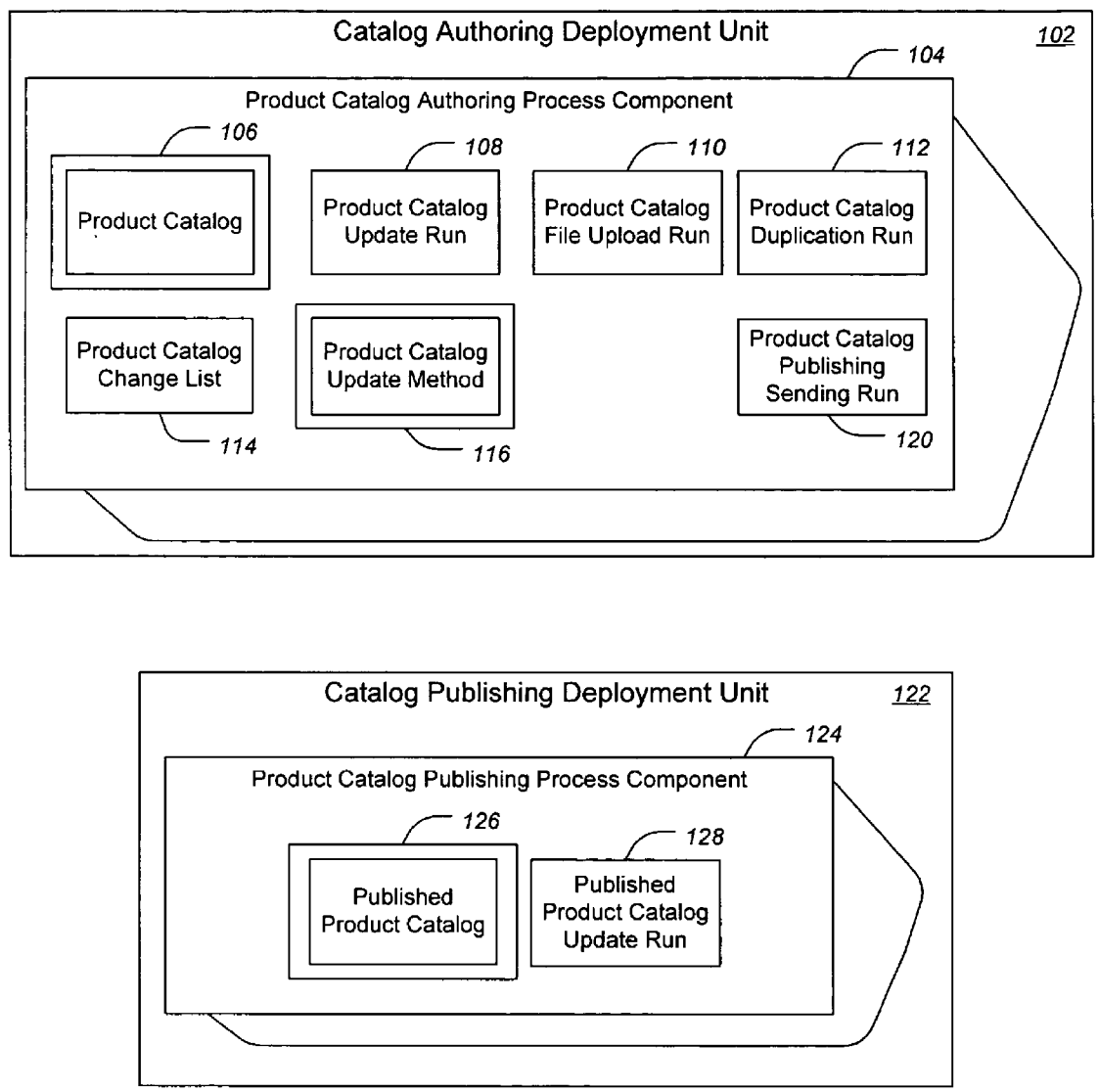
FIG. 1 illustrates a high-level view of a software architectural design and implementation of a suite of enterprise software services having product catalog functionality.

FIG. 1 illustrates a high-level view of a software architectural design, and of application software implementations of the design, that provides a suite of enterprise service operations, which can be organized into interfaces, having product catalog application functionality.

The elements of the architecture include the business object, the process component, the service operation (or simply, the operation), the service interface, the message, and the deployment unit. The elements can also include process agents and reuse service components. These will be generally described below.

In one implementation, the software is implemented to be deployed on an application platform that includes a foundation layer that contains all fundamental entities that can used from multiple deployment units. These entities can be process components, business objects or reuse service components. A reuse service component is a piece of software that is reused in different transactions. A reuse service component is used by its defined interfaces, which can be, e.g., local APIs (Application Programming Interfaces) or service interfaces.

The architectural design is a specification of a computer software application, and elements of the architectural design can be implemented to realize a software application that implements enterprise application service interfaces. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects.

A business object represents a specific view on some well-defined business content. A business object represents content, and instances of business objects include content, which a typical business user would expect and understand with little explanation. Whether an object as a type or an instance of an object is intended by the term is generally clear from the context, so the distinction will be made explicitly only when necessary. Properly implemented, business objects are implemented free of redundancies.

Business objects are further categorized as business process objects and, master data objects, mass data run objects, dependent objects, and transformed objects. A master data object is an object that encapsulates master data (i.e., data that is valid for a period of time). A business process object, which is the kind of business object generally found in a process component, is an object that encapsulates transactional data (i.e., data that is valid for a point in time). A mass data run object is an application object that executes an algorithm for a particular mass data run. An instance of a mass data run object contains a particular set of selections and parameters. A mass data run object implements an algorithm that modifies, manages, and/or processes a large amount of data in multiple transactions, possibly but not necessarily with parallel processing. A dependent object is a business object used as a reuse part in another business object. A dependent object represents a concept that cannot stand by itself from a business point of view. Instances of dependent objects only occur in the context of a non-dependent business object. A transformed object is a transformation of multiple business objects for a well-defined purpose. It transforms the structure of multiple business objects into a common structure. A transformed object does not have its own persistency. The term business object will be used generically to refer to a business process object and a master data object, unless the context requires otherwise. Properly implemented, business objects are implemented free of redundancies.

The architectural elements also include the process component. A process component is a software package that realizes a business process and generally exposes its functionality as services. The functionality contains business transactions. A process component contains one or more semantically related business objects. Any business object belongs to no more than one process component.

Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters, or some combination of them, serving as a signature. For convenience in supporting use of the operations supported by a system implementing elements of the design, such a system can optionally include a repository of service descriptions that includes a standards-based description of each of the supported service operations.

The architectural elements also include the service interface, which may be referred to simply as an interface. An interface is a named group of operations. Each operation belongs to exactly one interface. An interface belongs to exactly one process component. A process component might contain multiple interfaces. In one implementation, an interface contains only inbound or outbound operations, but not a mixture of both. One interface can contain both synchronous and asynchronous operations. All operations of the same type (either inbound or outbound) which belong to the same message choreography will preferably belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous.

Asynchronous outbound process agents are called after a business object changes, e.g., after a create, update, or delete of a business object instance.

Synchronous outbound process agents are generally triggered directly by a business object.

An output process agent will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components and, optionally, one or more business objects, that are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interactions (i.e., interactions between process components involving their respective business objects, operations, interfaces, and messages) within other deployment units. Similarly, process components that interact with other process components or external systems only through messages, e.g., as sent and received by operations, can also be replaced as long as the replacement supports the operations of the original.

Interactions between process components that occur only within a deployment unit are not constrained to using service operations. These can be implemented in any convenient fashion.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that should be specific to a deployment unit are preferably assigned to their respective deployment unit.

FIG. 1 illustrates a high-level view of a software architectural design and implementation of a suite of enterprise software services having product catalog functionality.

As shown in FIG. 1, a Catalog Authoring deployment unit 102 includes a Product Catalog Authoring process component 104, a Product Catalog master data object 106, a Product Catalog Update Run business object 108, a Product Catalog File Upload Run business object 110, a Product Catalog Duplication Run business object 112, a Product Catalog Change List business object 114, a Product Catalog Update Method master data object 116, and a Product Catalog Publishing Sending Run business object 120.

Additionally, as shown in FIG. 1, a Catalog Publishing deployment unit 122 includes: a Product Catalog Publishing process component 124, a Published Product Catalog master data object 126, and a Published Product Catalog Update Run business object 128.

Figure 2A:
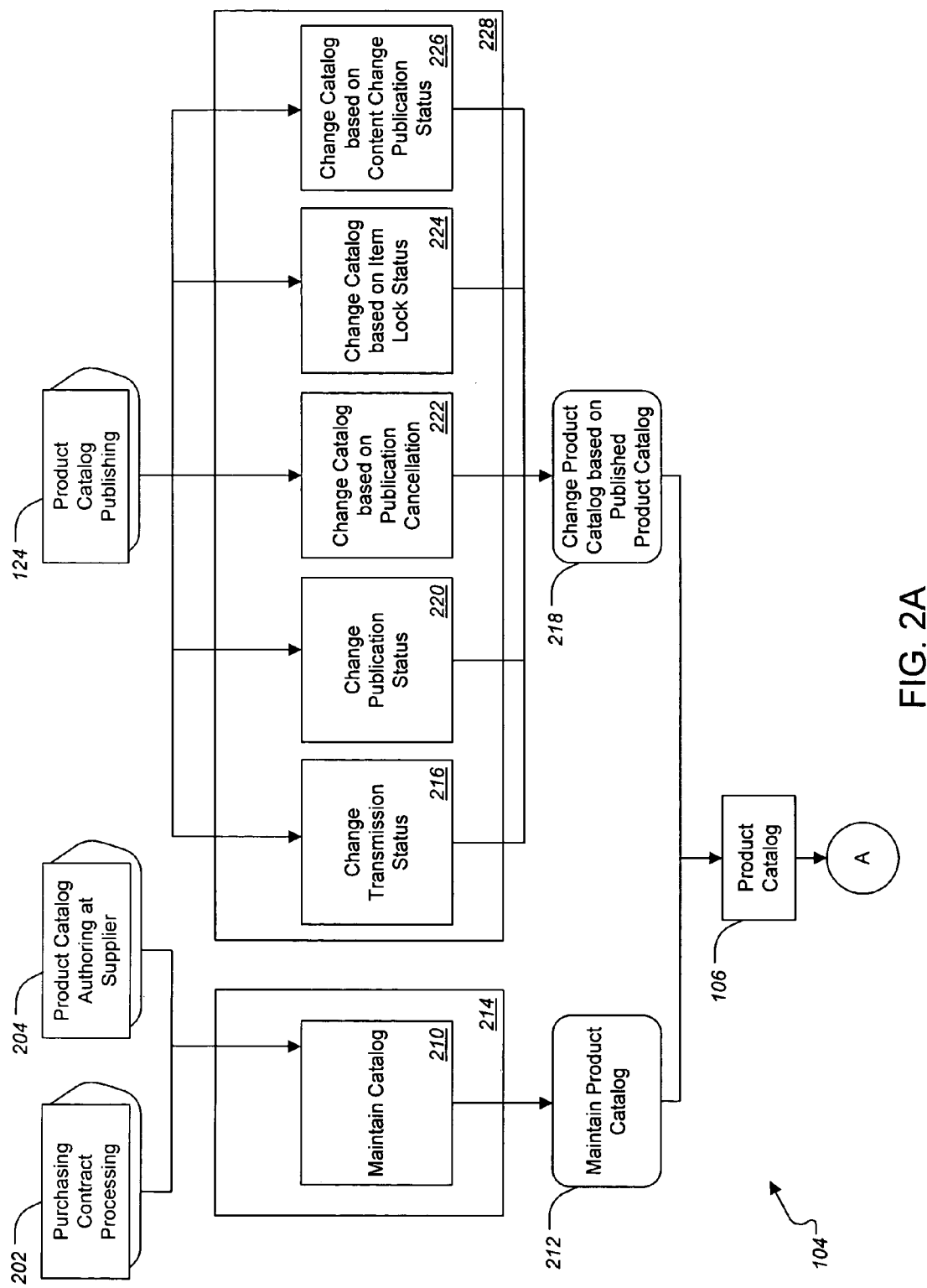
FIGS. 2A and 2B are block diagrams collectively showing a product catalog authoring process component.
Figure 2B:
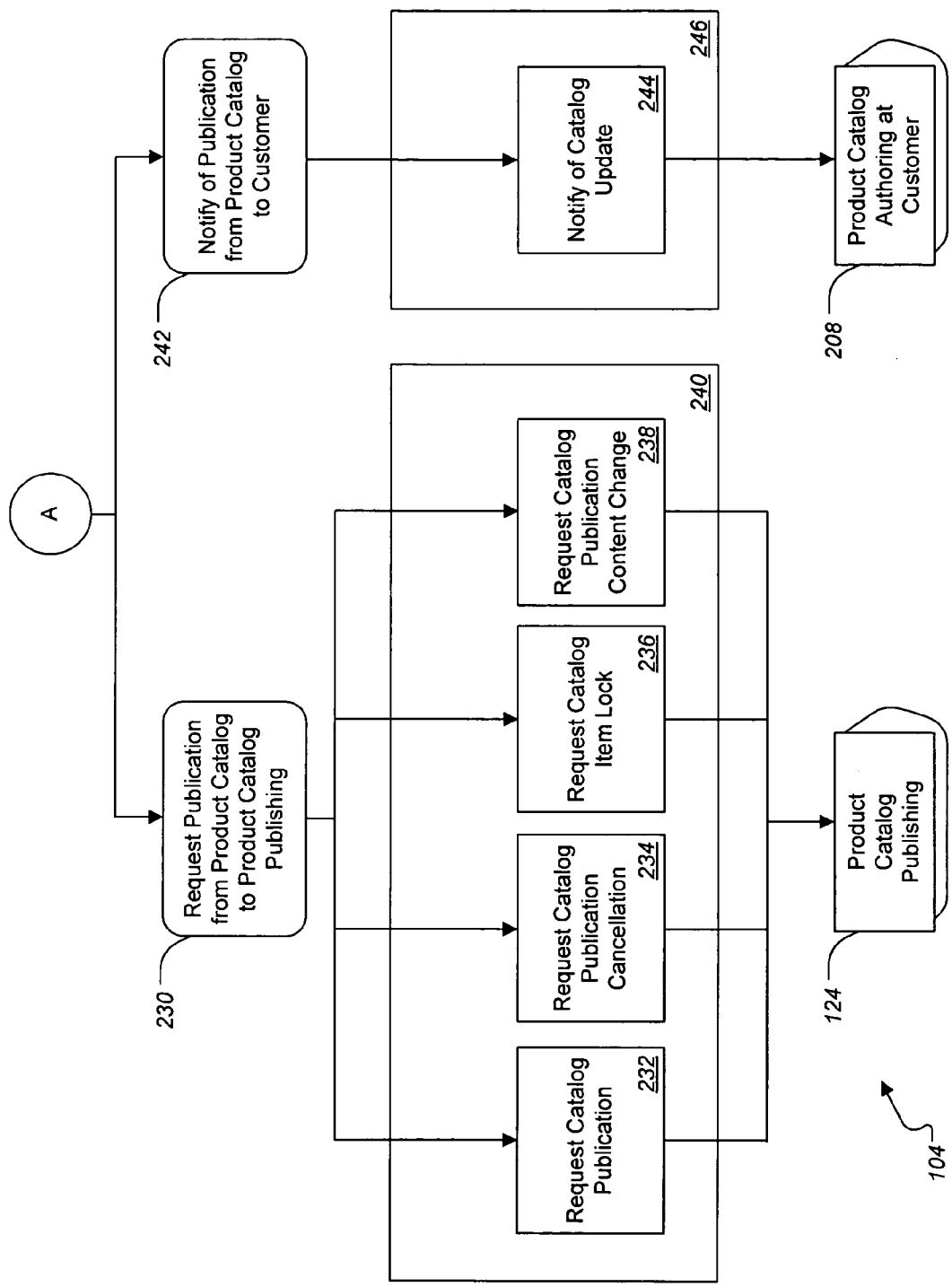

FIGS. 2A and 2B are block diagrams collectively showing the Product Catalog Authoring process component 104 (FIG. 1). For convenience in describing this process component, a number of other process components are shown in the figures; these other process components are not part of the process component being described. These other process components are a Purchasing Contract Processing process component 202, a Product Catalog Authoring at Supplier process component 204, a Product Catalog Publishing process component 124, and a Product Catalog Authoring at Customer process component 208. These other process components are used to represent software external to the process component in describing its interactions with the external software; however, while the external software can be implemented as such process components, this is not required.

A Maintain Catalog operation 210 sends a catalog maintenance request using a Maintain Product Catalog asynchronous inbound process agent 212 to update the Product Catalog master data object 106. For example, the operation 210 can send a request to update the Product Catalog master data object 106 if input is received from the Purchasing Contract Processing process component 202 or the Product Catalog Authoring at Supplier process component 204. The request can be to create a new product catalog, or to change or update an existing product catalog. The Maintain Catalog operation 210 is included in a Product Catalog Transmission Receiving In interface 214.

A Change Transmission Status operation 216 sends a product catalog transmission status change notification using a Change Product Catalog based on Published Product Catalog asynchronous inbound process agent 218 to update the Product Catalog master data object 106. For example, the operation 216 can send a change notification to update the Product Catalog master data object 106 if input is received from the Product Catalog Publishing process component 124. The change notification can be to update the status of a catalog publication transmission package sent out earlier.

A Change Publication Status operation 220 sends a product catalog publication status change using the Change Product Catalog based on Published Product Catalog asynchronous inbound process agent 218 to update the Product Catalog master data object 106. For example, the operation 220 can send a change notification to update the Product Catalog master data object 106 if input is received from the Product Catalog Publishing process component 124. The change notification can be to set the result status of an ongoing catalog publication transmission.

A Change Catalog based on Publication Cancellation operation 222 sends a product catalog change notification using the Change Product Catalog based on Published Product Catalog asynchronous inbound process agent 218 to update the Product Catalog master data object 106. For example, the operation 222 can send a change notification to update the Product Catalog master data object 106 if input is received from the Product Catalog Publishing process component 124. The change notification can be to update a catalog based on the cancellation of publication.

A Change Catalog based on Item Lock Status operation 224 sends a product catalog change notification using the Change Product Catalog based on Published Product Catalog asynchronous inbound process agent 218 to update the Product Catalog master data object 106. For example, the operation 224 can send a change notification to update the Product Catalog master data object 106 if input is received from the Product Catalog Publishing process component 124. The change notification can be to change a product catalog based on the change of status of a locked item within the catalog.

A Change Catalog based on Content Change Publication Status operation 226 sends a product catalog change notification using the Change Product Catalog based on Published Product Catalog asynchronous inbound process agent 218 to update the Product Catalog master data object 106. For example, the operation 226 can send a change notification to update the Product Catalog master data object 106 if input is received from the Product Catalog Publishing process component 124. The change notification can be to change a catalog based on a change of status of a catalog publication.

The Change Transmission Status operation 216, the Change Publication Status operation 220, the Change Catalog based on Publication Cancellation operation 222, the Change Catalog based on Item Lock Status operation 224, and the Change Catalog based on Content Change Publication Status operation 226 are included in a Publishing In interface 228.

The Product Catalog master data object 106 can receive updated information and send the update into other components to perform further operations. As shown in FIG. 2B, multiple message agents can receive information from the Product Catalog master data object 106.

A Request Publication from Product Catalog to Product Catalog Publishing asynchronous outbound process agent 230 can invoke a Request Catalog Publication operation 232. For example, the outbound process agent 230 can send a request to publish a product catalog. The Request Publication from Product Catalog to Product Catalog Publishing asynchronous outbound process agent 230 can also invoke a Request Catalog Publication Cancellation operation 234. For example, the outbound process agent 230 can send a request to cancel publication of a product catalog. The Request Publication from Product Catalog to Product Catalog Publishing asynchronous outbound process agent 230 can also invoke a Request Catalog Item Lock operation 236. For example, the outbound process agent 230 can send a request to lock an item a product catalog. The Request Publication from Product Catalog to Product Catalog Publishing asynchronous outbound process agent 230 can also invoke a Request Catalog Publication Content Change operation 238. For example, the outbound process agent 230 can send a request to change the information for an item in a product catalog. The Request Catalog Publication operation 232, the Request Catalog Publication Cancellation operation 234, the Request Catalog Item Lock operation 236, and the Request Catalog Publication Content Change operation 238 are included in a Publishing Out interface 240.

A Notify of Publication from Product Catalog to Customer asynchronous outbound process agent 242 invokes a Notify of Catalog Update operation 244, which notifies another party (e.g., a customer) about a catalog publication. This can be a new catalog or an update to a previously published catalog. The Notify of Catalog Update operation 244 is included in a Transmission Sending Out interface 246. As an example, the operation 244 can then send a notification to the Product Catalog Authoring at Customer process component 208.

Figure 3A:
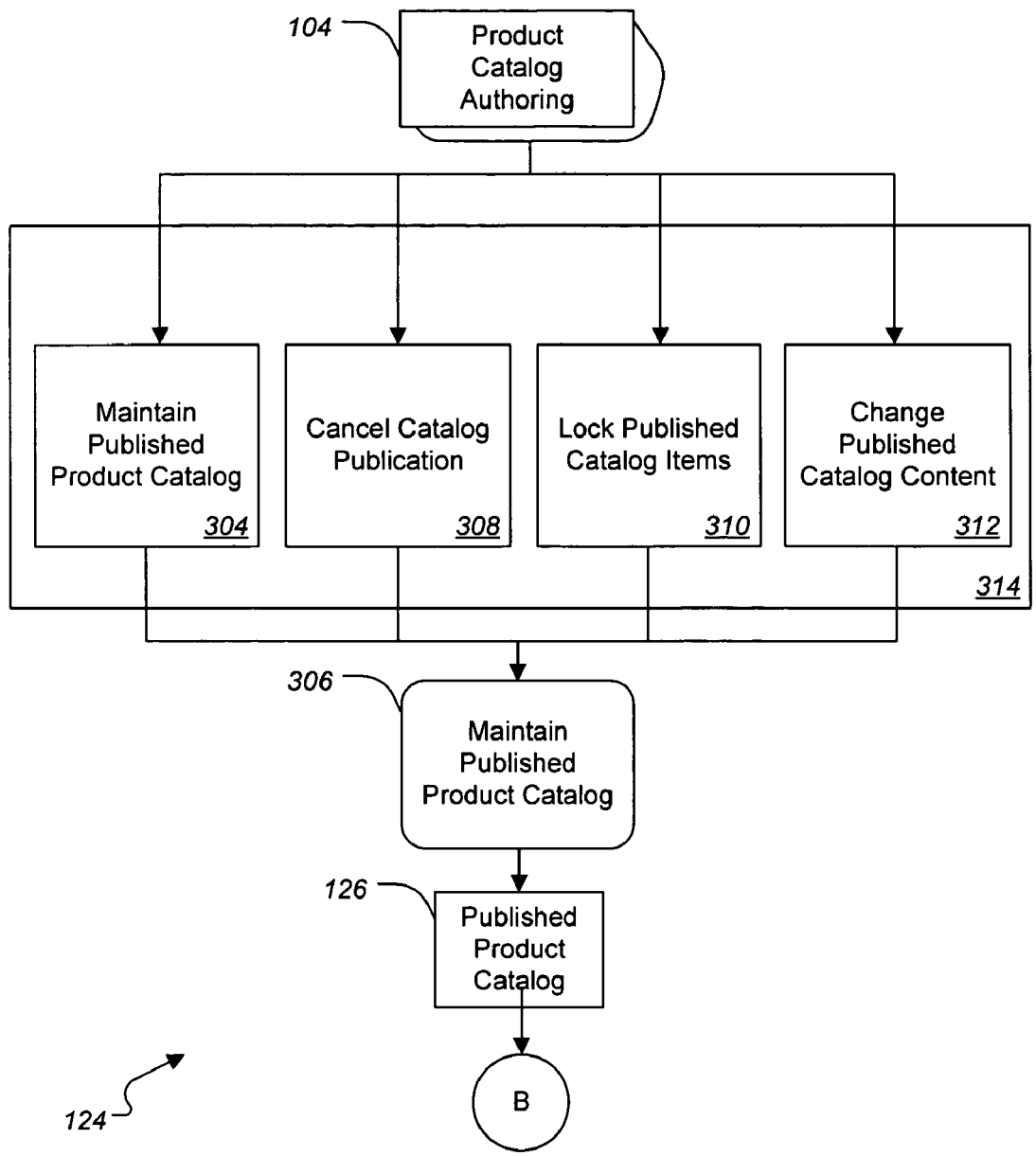
FIGS. 3A and 3B are block diagrams collectively showing a product catalog publishing process component.
Figure 3B:
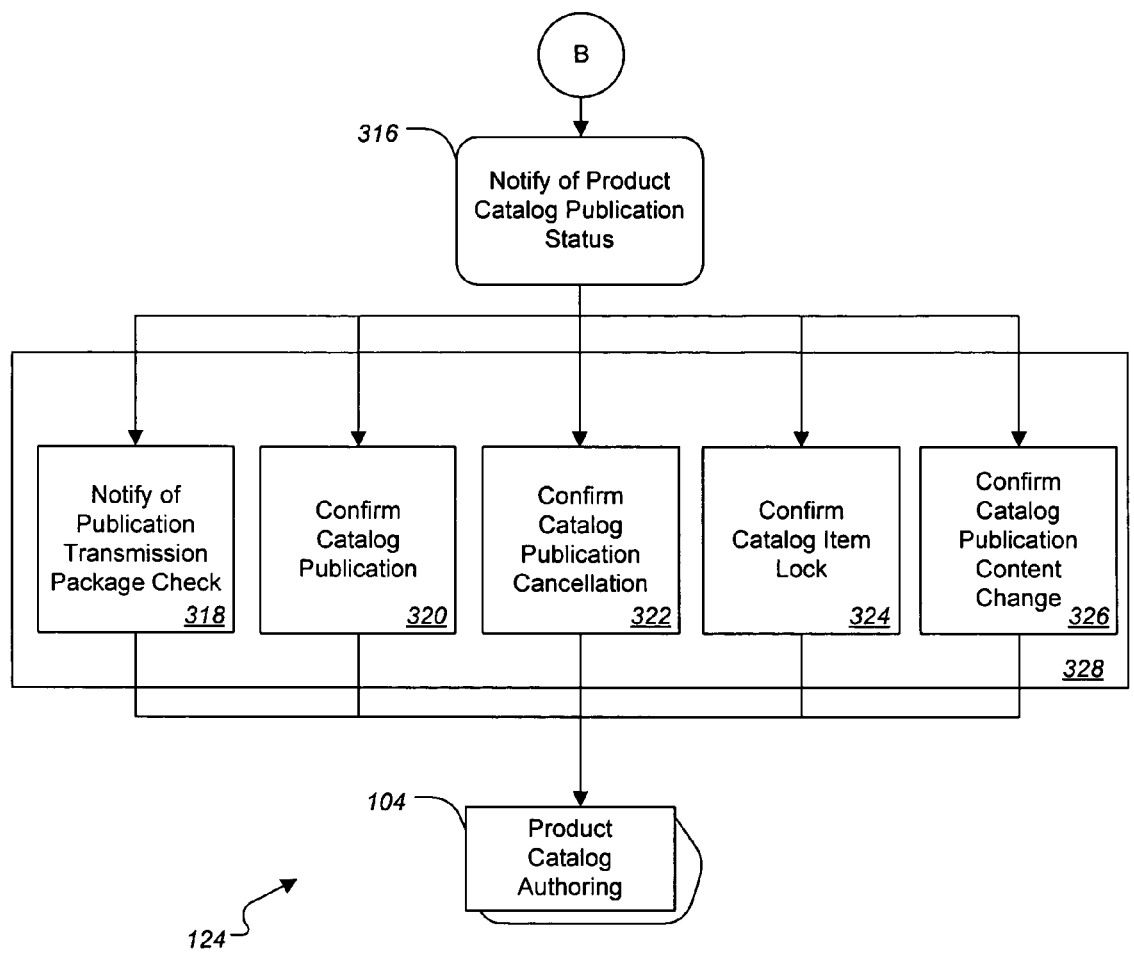

FIGS. 3A and 3B are block diagrams collectively showing the Product Catalog Publishing process component 124 (FIG. 1). For convenience in describing this process component, another process component is shown in the figures; this other process component is not part of the process component being described. This other process component is a Product Catalog Authoring process component 104. This other process component is used to represent software external to the process component in describing its interactions with the external software; however, while the external software can be implemented as such process components, this is not required.

A Maintain Published Product Catalog operation 304 can send a product catalog maintenance request using a Maintain Published Product Catalog asynchronous inbound process agent 306 to update the Published Product Catalog master data object 126. For example, the operation 304 can send a product catalog maintenance notification to update the Published Product Catalog master data object 126 if input is received from the Product Catalog Authoring process component 104. The maintenance notification can be to update the contents of a published catalog.

A Cancel Catalog Publication operation 308 can send a product catalog publication cancellation request using the Maintain Published Product Catalog asynchronous inbound process agent 306 to update the Published Product Catalog master data object 126. For example, the operation 308 can send a product catalog publication cancellation notification to update the Published Product Catalog master data object 126 if input is received from the Product Catalog Authoring process component 104. The maintenance notification can be to cancel the publication of a catalog.

A Lock Published Catalog Items operation 310 can send a product catalog item lock request using the Maintain Published Product Catalog asynchronous inbound process agent 306 to update the Published Product Catalog master data object 126. For example, the operation 310 can send a product catalog item lock notification to update the Published Product Catalog master data object 126 if input is received from the Product Catalog Authoring process component 104. The maintenance notification can be to place a lock on items within a published catalog.

A Change Published Catalog Content operation 312 can send a product catalog content change request using the Maintain Published Product Catalog asynchronous inbound process agent 306 to update the Published Product Catalog master data object 126. For example, the operation 312 can send a product catalog content change notification to update the Published Product Catalog master data object 126 if input is received from the Product Catalog Authoring process component 104. The maintenance notification can be to change the content of a published catalog.

The Maintain Published Product Catalog operation 304, the Cancel Catalog Publication operation 308, the Lock Published Catalog Items operation 310, and the Change Published Catalog Content operation 312 are included in a Publishing In interface 314.

The Published Product Catalog master data object 126 can receive updated information and send the update into other components to perform further operations. As shown in FIG. 3B, multiple process agents can receive information from the Published Product Catalog master data object 126.

A Notify of Product Catalog Publication Status asynchronous outbound process agent 316 can invoke a Notify of Publication Transmission Package Check operation 318. For example, the outbound process agent 316 can send a notification of a publication transmission package check. The Notify of Product Catalog Publication Status asynchronous outbound process agent 316 can also invoke a Confirm Catalog Publication operation 320. For example, the outbound process agent 316 can send a confirmation that a product catalog has been published. The Notify of Product Catalog Publication Status asynchronous outbound process agent 316 can also invoke a Confirm Catalog Publication Cancellation operation 322. For example, the outbound process agent 316 can send a confirmation that a product catalog publication has been cancelled. The Notify of Product Catalog Publication Status asynchronous outbound process agent 316 can also invoke a Confirm Catalog Item Lock operation 324. For example, the outbound process agent 316 can send a request to lock an item in a product catalog. The Notify of Product Catalog Publication Status asynchronous outbound process agent 316 can also invoke a Confirm Catalog Publication Content Change operation 326. For example, the outbound process agent 316 can send a request to change the information for an item in a product catalog. The Notify of Publication Transmission Package Check operation 318, the Confirm Catalog Publication operation 320, the Confirm Catalog Publication Cancellation operation 322, the Confirm Catalog Item Lock operation 324, and the Confirm Catalog Publication Content Change operation 326 are included in a Publishing Out interface 328.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A non-transitory computer readable storage medium including program code executed by a processor providing message-based services using a service-oriented methodology for implementing an instance of a catalog authoring deployment unit, the medium comprising:

program code storing an instance of the catalog authoring deployment unit for defining, editing, and releasing product catalogs in an enterprise application, where the catalog authoring deployment unit defines the limits of an application-defined transaction for defining, editing, and releasing product catalogs by a set of actions that have atomicity, consistency, isolation, and durability in a database, and wherein the actions associated with the application-defined transaction are performed by at least one process component contained in the catalog authoring deployment unit, wherein each process component comprises a software package realizing a business process and exposing the process component's functionality as at least one service operation, wherein the catalog authoring deployment unit comprises:

a maintain catalog operation operable to send a notification to update a product catalog, a change transmission status operable to send a notification to change the transmission status of a product catalog, a change publication status operation operable to send a notification to change the publication status of a product catalog, a change catalog based on publication cancellation operation operable to send a notification to update a product catalog based on a publication cancellation, a change catalog based on item lock status operation operable to send a notification to update a product catalog based on a locked item, a change catalog based on a content change publication status operation operable to send a notification to update a product catalog based on a catalog change content publication status, a request catalog publication operation operable to request that a product catalog be published, a request catalog publication cancellation operation operable to request a product catalog publication be cancelled, a request catalog item lock operation operable to request an item in a product catalog to be locked, a request catalog publication content change operation operable to request a content change in a product catalog publication, and a notify of catalog update operation operable to send a notification about an update to a product catalog;

wherein the service operations of the catalog authoring deployment unit are packaged together to be deployed on a single computer system;

program code executing the application-defined transaction for defining, editing, and releasing product catalogs in the enterprise application; and program code presenting data associated with the executed application-defined transaction for defining, editing, and releasing product catalogs in an enterprise application to a graphical user interface.

2. The medium of claim 1, wherein the catalog authoring deployment unit further comprises a product catalog authoring process component.

3. The medium of claim 2, wherein the product catalog authoring process component implements the maintain catalog operation, the change transmission status operation, the change publication status operation, the change catalog based on publication cancellation operation, the change catalog based on item lock status operation, the change catalog based on content change publication status operation, the request catalog publication operation, the request catalog publication cancellation operation, the request catalog item lock operation, the request catalog publication content change operation, and the notify of catalog update operation.

4. The medium of claim 2, wherein the product catalog authoring process component comprises a product catalog master data object, a product catalog update run business object, a product catalog file upload run business object, a product catalog duplication run business object, a product catalog change list business object, a product catalog update method master data object, and a product catalog publishing sending run business object; wherein:

the product catalog master data object is the business object responsible for the structured directory of catalog items where each catalog item represents a product and provides information about it;

the product catalog update run business object is the business object responsible for the run to update product catalogs based on product catalog update methods;

the product catalog file upload run business object is the business object responsible for the run to update a product catalog based on an uploaded file;

the product catalog duplication run business object is the business object responsible for the run to copy a product catalog in total or in parts;

the product catalog change list business object is the business object responsible for the list of changes to a product catalog;

the product catalog update method master data object is the business object responsible for the set of rules controlling how products are cataloged in a product catalog and how to update the product catalog when cataloged products are changed; and the product catalog publishing sending run is the business object responsible for the run to trigger sending a product catalog for publication.

5. The medium of claim 1, wherein the service operations are grouped into service interfaces, the service interfaces comprising:

a product catalog transmission receiving in interface that includes the maintain catalog service operation;

a publishing in interface that includes the change transmission status, the change publication status, the change catalog based on publication cancellation status, the change catalog based on item lock status, and the change catalog based on content change publication status service operations;

a publishing out interface that includes the request catalog publication, the request catalog publication cancellation, the request catalog item lock, and the request catalog publication content change service operations; and a transmission sending out interface that includes the notify of catalog update service operation.

6. The medium of claim 1, wherein the single computer system comprises a single physical hardware platform.

7. A non-transitory computer readable storage medium including program code executed by a processor providing message-based services using a service-oriented methodology for implementing an instance of a catalog publishing deployment unit, the medium comprising:

program code storing an instance of the catalog publishing deployment unit, where the catalog publishing deployment unit defines the limits of an application-defined transaction for providing released product catalogs for use in business processes by a set of actions that have atomicity, consistency, isolation, and durability in a database, and wherein the actions associated with the application-defined transaction are performed by at least one process component contained in the catalog publishing deployment unit, wherein each process component comprises a software package realizing a business process and exposing the process component's functionality as at least one service operation, wherein the catalog publishing deployment unit comprises:

a maintain published product catalog operation operable to send a notification to update a published product catalog, a cancel catalog publication operation operable to send a notification to cancel the publication of a product catalog, a lock published catalog items operation operable to send a notification to lock items contained in a published product catalog, a change published catalog content operation operable to send a notification to change the content in a published product catalog, a notify of publication transmission package check operation operable to send a notification about a catalog publication transmission package check, a confirm catalog publication operation operable to send a notification to confirm the publication of a product catalog, a confirm catalog publication cancellation operation operable to send a notification to confirm the cancellation of a product catalog publication, a confirm catalog item lock operation operable to send a notification to confirm the lock of an item in a product catalog, and a confirm catalog publication content change operation operable to send a notification to confirm the content change of a product catalog publication;

wherein the service operations of the catalog authoring deployment unit are packaged together to be deployed on a single computer system;

program code executing the application-defined transaction for providing released product catalogs for use in business processes; and program code presenting data associated with the executed application-defined transaction for providing released product catalogs for use in business processes to a graphical user interface.

8. The medium of claim 7, wherein the catalog publishing deployment unit further comprises a product catalog publishing process component.

9. The medium of claim 8, wherein the product catalog publishing process component implements the maintain published product catalog operation, the cancel catalog publication operation, the lock published catalog items operation, the change published catalog content operation, the notify of publication transmission package check operation, the confirm catalog publication operation, the confirm catalog publication cancellation operation, the confirm catalog item lock operation, and the confirm catalog publication content change operation.

10. The medium of claim 8, wherein the product catalog publishing process component comprises a published product catalog business object and a published product catalog update run business object, wherein:

the published product catalog business object is a master data object representing a version of a product catalog that has been released for access by or exchange with the target group of people for whom the product catalog has been tailored; and the published product catalog update run business object represents a run to update a product catalog based on an uploaded file.

11. The medium of claim 7, wherein the service operations are grouped into service interfaces, the service interfaces comprising:

a publishing in interface that includes the maintain published product catalog, the cancel catalog publication, the lock published catalog items, and the change published catalog content service operations; and a publishing out interface that includes the notify of publication transmission package check, the confirm catalog publication, the confirm catalog publication cancellation, the confirm catalog item lock, and the confirm catalog publication content change service operations.

12. The medium of claim 7, wherein the single computer system comprises a single physical hardware platform.

\* \* \* \* \*